United States Patent
Gurudutt et al.

(10) Patent No.: US 6,854,749 B2
(45) Date of Patent: Feb. 15, 2005

(54) ASSEMBLY WITH CLAMP-FORCE-CHECK-COMPONENT

(75) Inventors: Vish N. Gurudutt, Fort Wayne, IN (US); David C. Merriman, deceased, late of St. Joe, IN (US); by James H Merriman, legal representative, St. Joe, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 09/999,823

(22) Filed: Oct. 31, 2001

(65) Prior Publication Data

US 2003/0080525 A1 May 1, 2003

(51) Int. Cl.[7] .................................................. B60G 9/02
(52) U.S. Cl. ................................ 280/124.116; 411/501; 411/531
(58) Field of Search ................... 280/124.153, 124.116, 280/124.128; 411/427, 432, 531, 547, 501

(56) References Cited

U.S. PATENT DOCUMENTS

| | | | | |
|---|---|---|---|---|
| 3,961,826 A | * | 6/1976 | Sweet et al. ................. 301/125 |
| 4,633,564 A | * | 1/1987 | Sauber ........................ 29/401.1 |
| 4,867,625 A | * | 9/1989 | Dixon .......................... 411/361 |
| 5,037,126 A | * | 8/1991 | Gottschalk et al. ... 280/124.116 |
| 5,129,672 A | * | 7/1992 | Hiromoto et al. ...... 280/124.06 |
| 5,171,036 A | * | 12/1992 | Ross .................... 280/124.116 |
| 5,190,423 A | * | 3/1993 | Ewing .......................... 411/134 |
| 5,362,095 A | * | 11/1994 | Eveley .................... 280/86.75 |
| 5,366,238 A | * | 11/1994 | Stephens ............. 280/124.116 |
| 5,458,360 A | * | 10/1995 | Raidel, Sr. .................. 280/686 |
| 5,604,968 A | * | 2/1997 | Fulbright et al. ........ 29/407.05 |
| 6,550,798 B2 | * | 4/2003 | MacKarvich ............ 280/149.2 |

* cited by examiner

*Primary Examiner*—Eric Culbreth
(74) *Attorney, Agent, or Firm*—Jeffrey P. Calfa; Dennis Kelly Sullivan; Susan L. Lukasik

(57) ABSTRACT

An assembly which includes a fastener assembly that clamps together two or more clamped components between clamping structures of the fastener assembly. One of the clamped components that the fastener assembly clamps together with the other clamped components is a clamp-force-check component that defines a fastener hole through itself. The clamp-force-check component is disposed adjacent one of the clamping structures of the fastener assembly. A fastener shaft of the fastener assembly extends through the fastener hole defined through the clamp-force-check component. The clamp-force-check component has an outer perimeter of such a shape that a wrench may engage the outer perimeter of the clamp-force-check component and apply a torque thereto.

16 Claims, 8 Drawing Sheets

US 6,854,749 B2

ASSEMBLY WITH CLAMP-FORCE-CHECK-COMPONENT

BACKGROUND OF THE INVENTION

The present invention relates to assemblies that have two or more clamped components that are clamped together by a fastener assembly. In such assemblies, one or more of the two or more clamped components defines through itself a fastener hole. The fastener assembly that clamps the two or more clamped components together comprises a fastener shaft that extends through the fastener hole. The fastener assembly, further comprises two clamping structures each of which extends radially outwardly from the fastener shaft in directions perpendicular to an axis of the fastener shaft and each of which is spaced relative to the other in directions parallel to the axis of the fastener shaft. Portions of the two or more clamped components are clamped between the two clamping structures of the fastener assembly. There are many different well-known types of fastener assemblies that can function in such a way to clamp two or more clamped components together including but not necessarily limited to threaded fasteners (such as bolts and nuts), rivets, and swaged-collar fasteners such as those illustrated in U.S. Pat. No. 5,604,968 to Huck Patents, Inc. which patent is incorporated herein by reference. For purposes of this disclosure swaged-collar fasteners will be considered to be any fastener such as those illustrated in U.S. Pat. No. 5,604,968 or similar thereto in that they comprise some type of fastener shaft with a clamping structure at one end and a clamping collar which constitutes the other clamping structure of the fastener and which is secured to the fastener shaft by plastically deforming the collar until it has an interference fit with the fastener shaft.

The magnitude of the clamping force applied to two or more clamped components by a fastener assembly that clamps the clamped components together is important. In most applications of fastener assemblies it is preferred that two or more clamped components that are clamped together by a fastener assembly are clamped with sufficient force to prevent them from slipping relative to one another. Unfortunately, for many types of fastener assemblies, including rivets and swaged-collar fasteners, there is no known way to ascertain, even approximately, what magnitude of clamping force is applied to two or more clamped components that are clamped together by the fastener assembly.

SUMMARY OF INVENTION

As a result, an object of the present invention is to provide an assembly of two or more clamped components clamped together by a fastener assembly for which it is possible to measure a condition of the assembly which is correlated to the magnitude of the clamp force applied to the clamped components by the fastener assembly.

The present invention is an assembly that includes two or more clamped components that are clamped together by a fastener assembly. One of the two or more clamped components of the assembly of the present invention is a clamp-force-check component. The clamp-force-check component defines a fastener hole, which is aligned with a fastener hole of an adjacent clamped component and through which a fastener shaft of the fastener assembly extends. The fastener assembly comprises two clamping structures, each of which extends radially outwardly of the fastener shaft in directions perpendicular to the axis of the fastener shaft and each of which is spaced relative to one another in directions parallel to the axis of the fastener shaft. Portions of the two or more clamped components, including the portion of the clamp-force-check component that surrounds the fastener hole thereof, are disposed between and are clamped together by the two clamping structures of the fastener assembly. The clamp-force-check component is disposed directly in contact with one of the clamping structures of the fastener assembly. Outer perimeters of cross-sections of the clamp-force-check component perpendicular to the axis of the fastener shaft have a non-circular shape so that a wrench may be engaged to the clamp-force-check component in such a manner to apply a torque to the clamp-force-check component about axes parallel to the axis of the fastener shaft. Thus, a wrench may be used to apply a torque to the clamp-force-check component and the magnitude of the torque that is applied to the clamp-force-check component may be measured. The magnitude of torque that can be applied to the clamp-force-check component before it slips relative to the adjacent clamped component and/or the adjacent clamping structure of the fastener assembly is proportional to the clamping force applied to the clamp-force-check component and the other clamped components clamped together by the fastener assembly. Thus, the assembly may be checked for proper clamp force one of two ways. There may be a predetermined magnitude of torque that it is decided the clamp-force-check component should be able to absorb without slipping, if the clamp force applied to the clamped components by the fastener assembly is to be deemed sufficient. In such a case, a torque of the predetermined magnitude would be applied to the clamp-force-check component and, if the clamp-force-check component does not slip, it will be deemed that the clamp force applied to the clamped components by the fastener assembly is of sufficient magnitude. Alternatively, it may be desirable to gather information related to the actual magnitude of the clamp force applied to the clamped components of the assembly by the fastener assembly. In such a situation a torque of increasing magnitude would be applied to the clamp-force-check component and the magnitude of torque, at which the clamp-force-check component slips, would be measured and recorded.

Thus, it can be seen that the above-mentioned object of the present invention as well as others not mentioned have been met.

DRAWINGS

Other objects and advantages of the invention will become more apparent upon perusal of the detailed description thereof and upon inspection of the drawings in which.

DETAILS OF INVENTION

Figure 1:
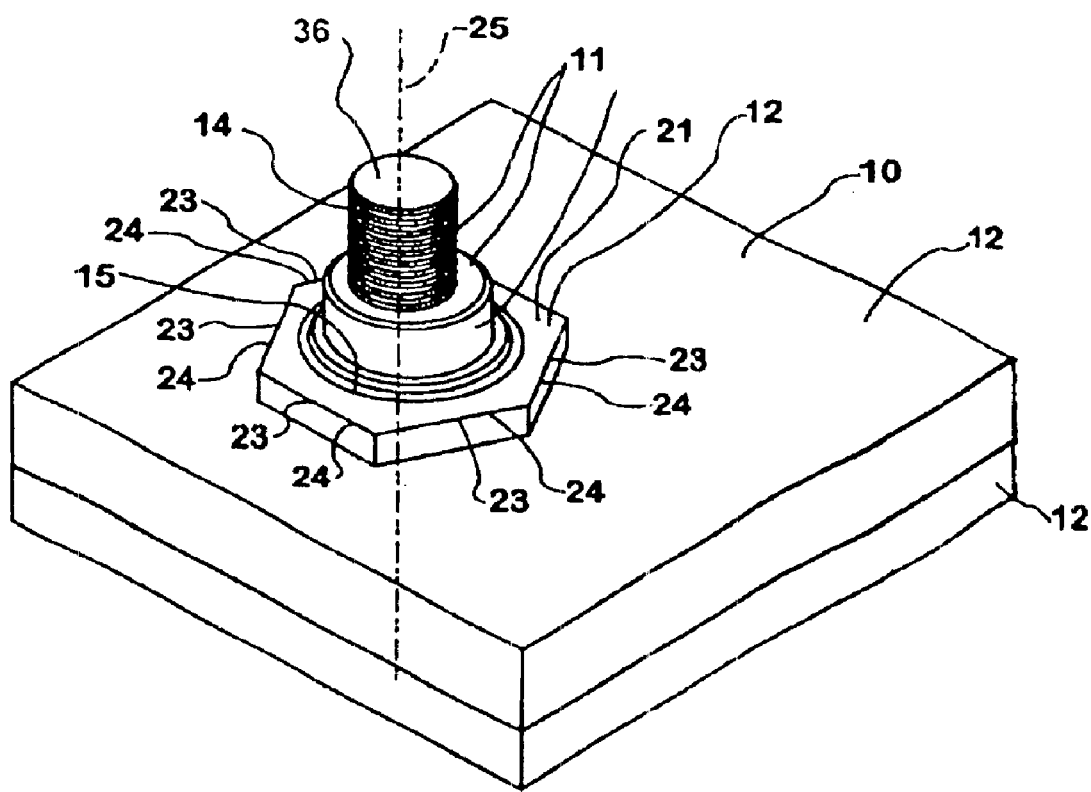
FIG. 1 is a perspective view of an assembly according to the present invention including three clamped components, one of which is a clamp-force-check component according to the present invention, clamped together by a fastener assembly.
Figure 2:
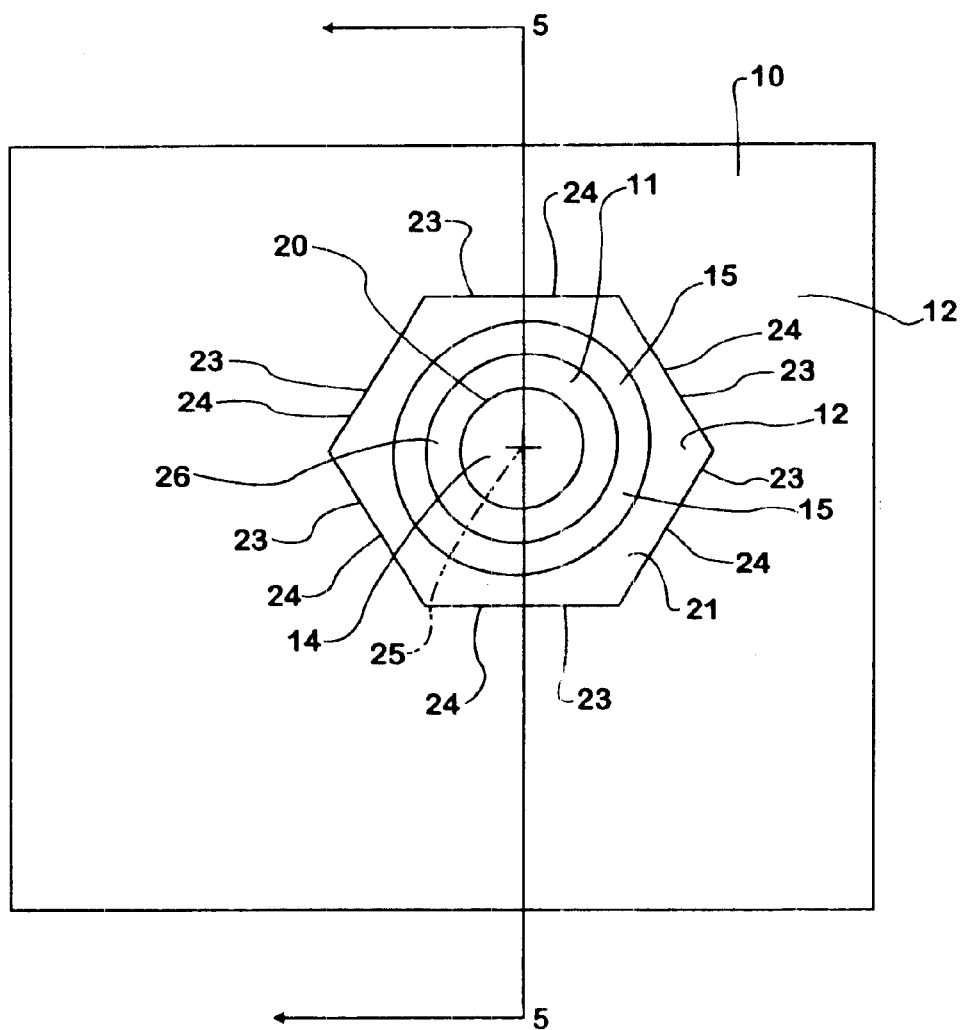
FIG. 2 is an end view of an assembly according to the present invention including three clamped components, one of which is a clamp-force-check component according to the present invention, clamped together by a fastener assembly.
Figure 3:
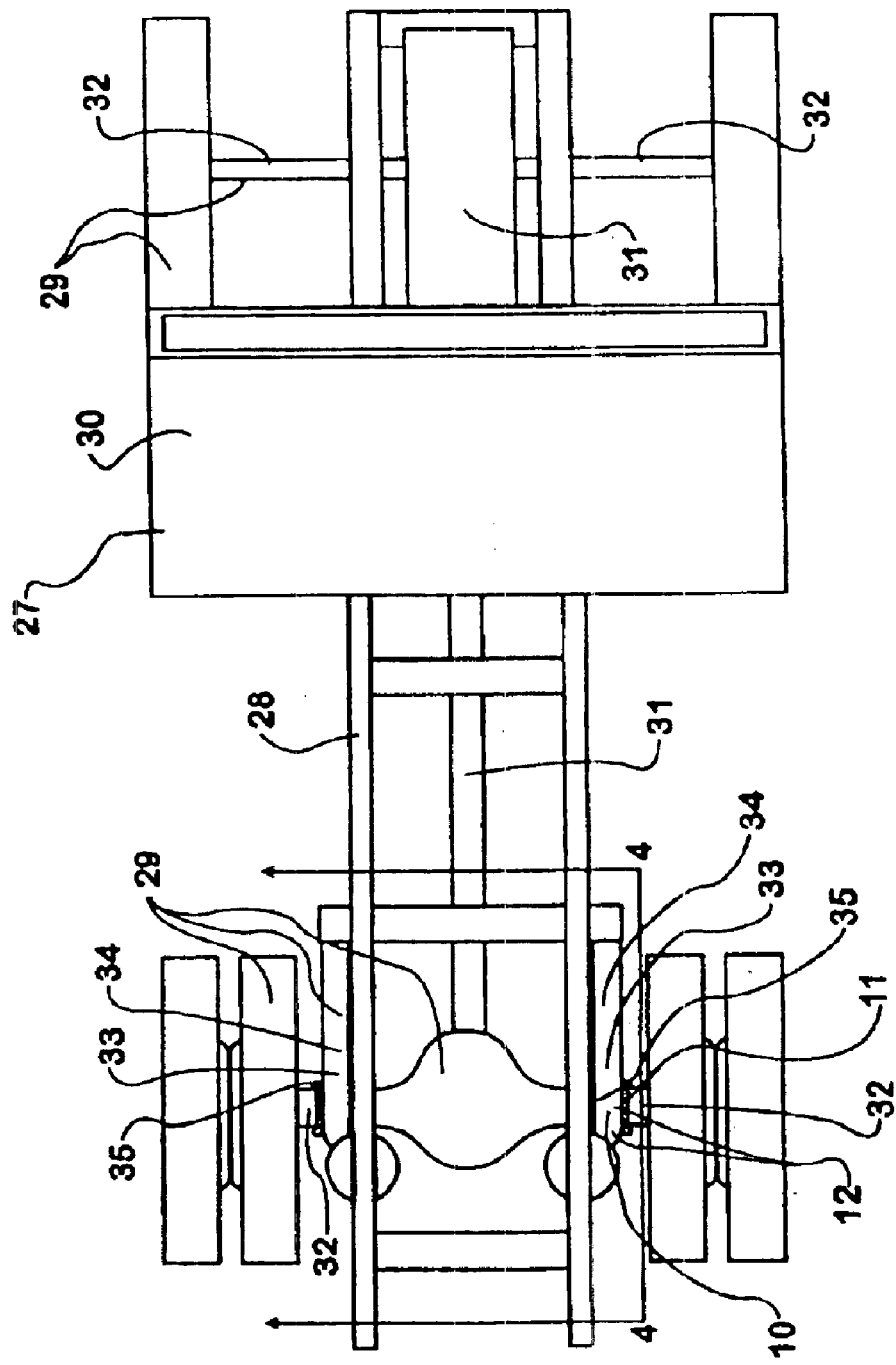
FIG. 3 is a top view of a vehicle which includes an assembly with two or more clamped components including the clamp-force-check component of the present invention clamped together by a fastener assembly.

The present invention is an assembly 10 that includes two or more clamped components 12 that are clamped together by a fastener assembly 11. One of the two or more clamped components 12 of the assembly 11 of the present invention is a clamp-force-check component 21. The clamp-force-check component 21 defines a hole 13a, which is aligned with a fastener hole 13b of an adjacent clamped component 12 and through which a fastener shaft 14 of the fastener assembly 11 extends. The fastener assembly 11 comprises two clamping structures 15a, 15b, each of which extends radially outwardly of the fastener shaft 14 in directions perpendicular to the axis 25 of the fastener shaft 14. Portions of the two or more clamped components 12, including the portion of the clamp-force-check component 21 that surrounds the hole 13a thereof, are disposed between and are clamped together by the two clamping structures 15 of the fastener assembly 11. The clamp-force-check component 21 is disposed directly in contact with one of the clamping structures 15 of the fastener assembly 11. Outer perimeters 23 of cross-sections of the clamp-force-check component 21 perpendicular to the axis 25 of the fastener shaft 14 have a noncircular shape so that a wrench may be engaged to the clamp-force-check component 21 in such a manner to apply a torque to the clamp-force-check component 21 about axes parallel to the axis 25 of the fastener shaft 14. Thus, a wrench may be used to apply a torque to the clamp-force-check component 21 and the magnitude of the torque that is applied to the clamp-force-check component 21 may be measured. The magnitude of torque that can be applied to the clamp-force-check component 21 before it slips relative to the adjacent clamped component 12 and/or the adjacent clamping structure 15 of the fastener assembly 11 is proportional to the clamping force applied to the clamp-force-check component 21 and the other clamped components 12 by the fastener assembly 11. Thus, the assembly 10 may be checked for proper clamp force one of two ways. There may be a predetermined magnitude of torque that it is decided the clamp-force-check component 21 should be able to absorb without slipping, if the clamp force applied to the clamped components 12 by the fastener assembly 11 is to be deemed sufficient. In such a case, a torque of the predetermined magnitude would be applied to the clamp-force-check component 21 and, if the clamp-force-check component 21 does not slip, it will be deemed that the clamp force applied to the clamped components 12 by the fastener assembly 11 is of sufficient magnitude. Alternatively it may be desirable to gather information related to the actual magnitude of the clamp force applied to the clamped components 12 of the assembly 10 by the fastener assembly 11. In such a situation a torque of increasing magnitude would be applied to the clamp-force-check component 21 and the magnitude of torque, at which the clamp-force-check component 21 slips, would be measured and recorded.

The fastener assembly 11 that is used to clamp together the two or more clamped components 12 of the assembly 10 of the present invention may be of many different types including, but not limited to, rivets, schematically shown at 36, threaded fasteners (such as bolts and nuts), or swaged-collar fasteners, schematically shown at 20. The use of a clamp-force-check component 21 as described herein is most beneficial, however, for allowing checking of clamp force applied to clamped components by fastener assemblies that are rivets 36 or swaged-collar fasteners 20. The inclusion of a clamp-force-check component 21 in an assembly utilizing a rivet 36 or swaged-collar fastener 20 is particularly beneficial because there is virtually no other means for checking the clamp force applied to clamped components by rivets or swaged-collar fasteners 20. The assemblies 10 shown in the figures include fastener assemblies 11 that are swaged-collar fasteners 20 or rivets 36.

The clamp-force-check component 21 may have any of a number of shapes that make it possible for a wrench to apply a torque to the clamp-force-check component about axes perpendicular to the axis 25 of the fastener shaft 14. The clamp-force-check component may 21 have any shape such that cross-sections of it perpendicular to the axis 25 of the fastener shaft 14 have outer perimeters 23 that are non-circular in shape. One or more types of wrenches well known and/or easily imaginable by one of ordinary skill in the art could be constructed to apply a torque to any such clamp-force-check component 21 with an outer perimeter 23 that is none-circular in shape. In the preferred embodiment, the clamp-force-check component 21 has a shape such that cross-sections of it perpendicular to the axis 25 of the fastener shaft 14 have outer perimeters 23 that include at least two straight portions 24 that are parallel to one another and that are also disposed upon opposite sides of the outer perimeter 23 from one another. Also in the preferred embodiment, one or more pairs of oppositely disposed parallel straight portions 24 of the outer perimeter 23 of the clamp-force-check component are spaced from one another by approximately an integer number of millimeters or a multiple of 1/16 of an inch so that the clamp-force-check component 21 can be grasped by a standard metric or English sized wrench. Additionally, in the preferred embodiment, the outer perimeter 23 of the clamp-force-check component 21 is polygonal in shape, has an even number of sides of equal length and is, in fact, hexagonal.

In the preferred embodiment the clamp-force-check component 21 has a shape and size such that a wrench thereof that is to be used to apply torque to the clamp-force-check component 21 may be slid past the clamping structure 15 adjacent the clamp-force-check component 21 and engaged to the clamp-force-check component 21. In this embodiment the clamp-force-check component 21 is of such a size and shape that, cross-sections of the clamp-force-check component 21 perpendicular to the axis 25 of the fastener shaft 14 have outer perimeters 23 that are disposed further radially outward of the axis 25 of the fastener shaft 14 than outer perimeters of the clamping structure 15 that is disposed adjacent the clamp-force-check component 21. A wrench used to apply a torque to the clamp-force-check component 21, must define an opening within which the clamp-force-check component 21 resides when the wrench is engaged to the clamp-force-check component 21 in such a manner that it may be used to apply a torque to the clamp-force-check component 21. This opening defined by the wrench must obviously have an inner perimeter that is larger than the outer perimeter 23 of the clamp-force-check component 21, which in the preferred embodiment is larger than outer perimeters of the adjacent clamping structure 15. Thus, in the preferred embodiment, the inner perimeter of the opening in a wrench that may be used to apply a torque to the clamp-force-check component 21 is larger than outer perimeters of the clamping structure 15 adjacent the clamp-force-check component 21 and the wrench may be engaged to the clamp-force-check component 21 by first passing the clamping structure 15 through the opening in the wrench.

Figure 4:
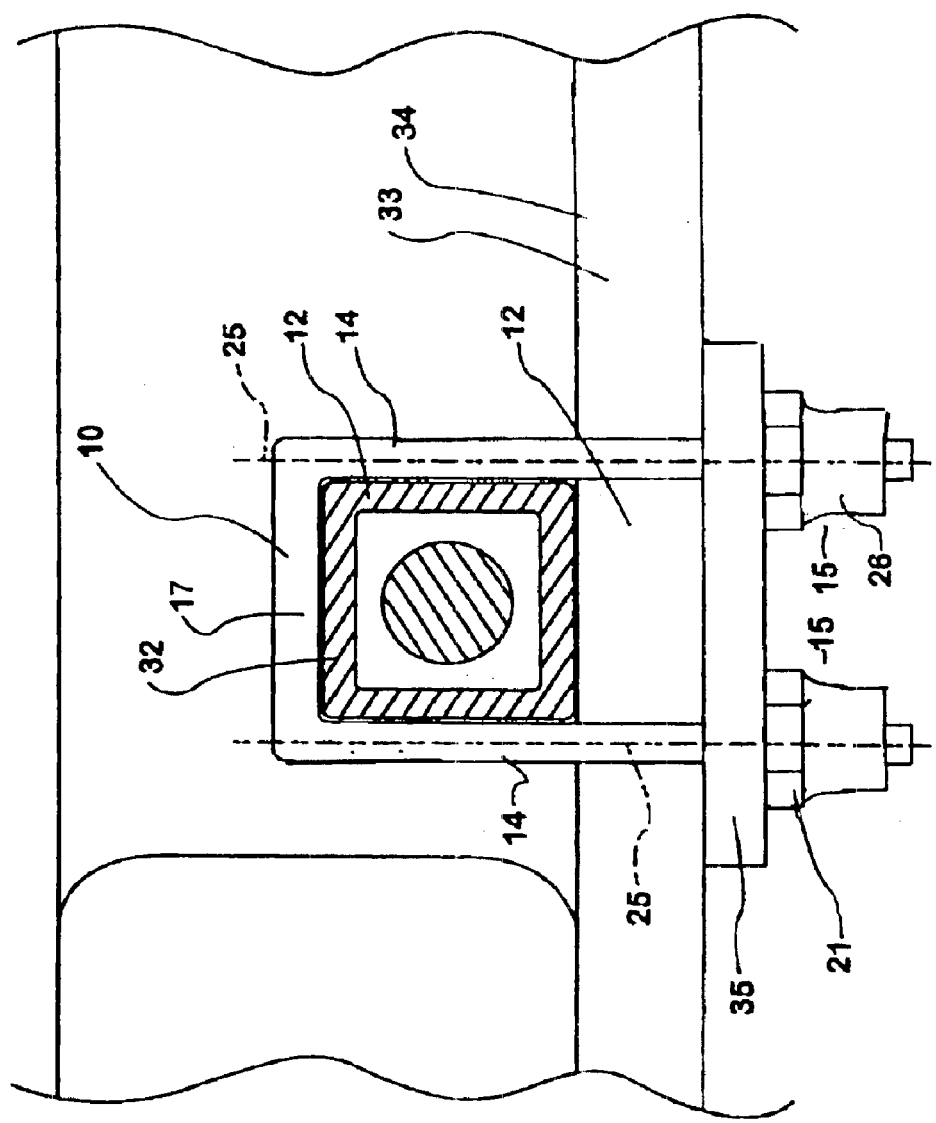
FIG. 4 is a sectional view through line 4—4 of FIG. 3 showing clamped components which comprise an axle beam, an axle locating component, a clamp plate, and the clamp-force-check component of the present invention, clamped together by a fastener assembly.
Figure 5:
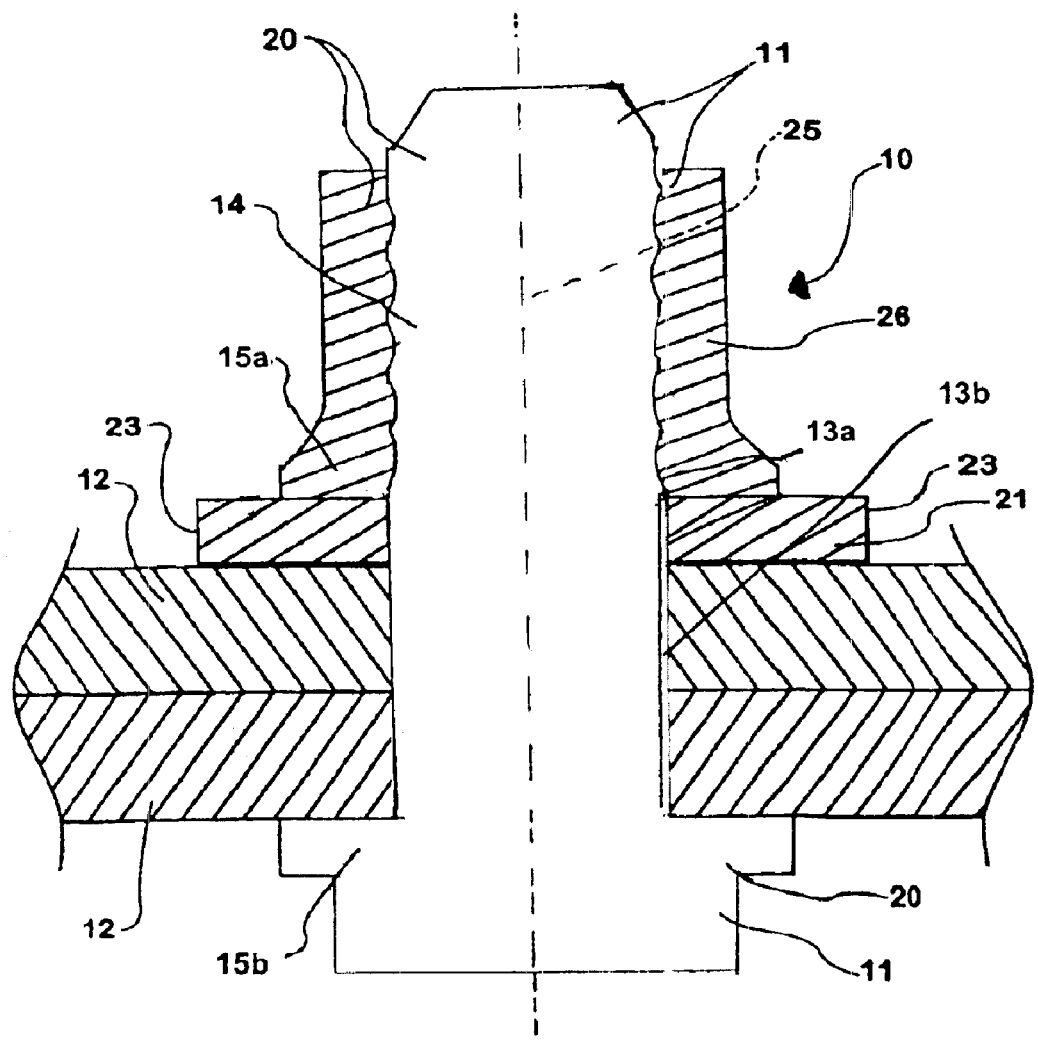
FIG. 5 is a sectional view through line 5—5 of FIG. 2.
Figure 6:
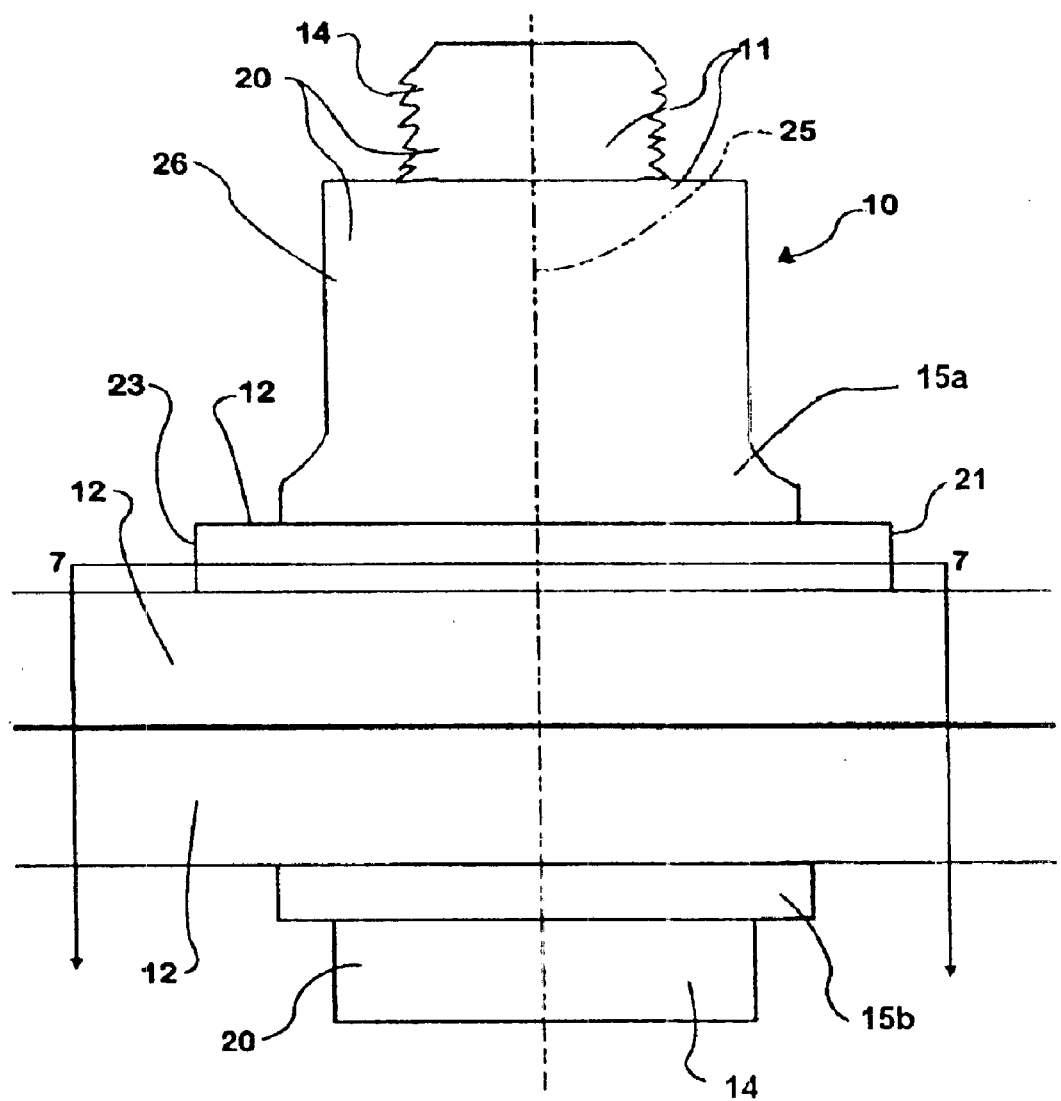
FIG. 6 is side view of an assembly according to the present invention including three clamped components, one of which is a clamp-force-check component according to the present invention, clamped together by a fastener assembly.
Figure 7:
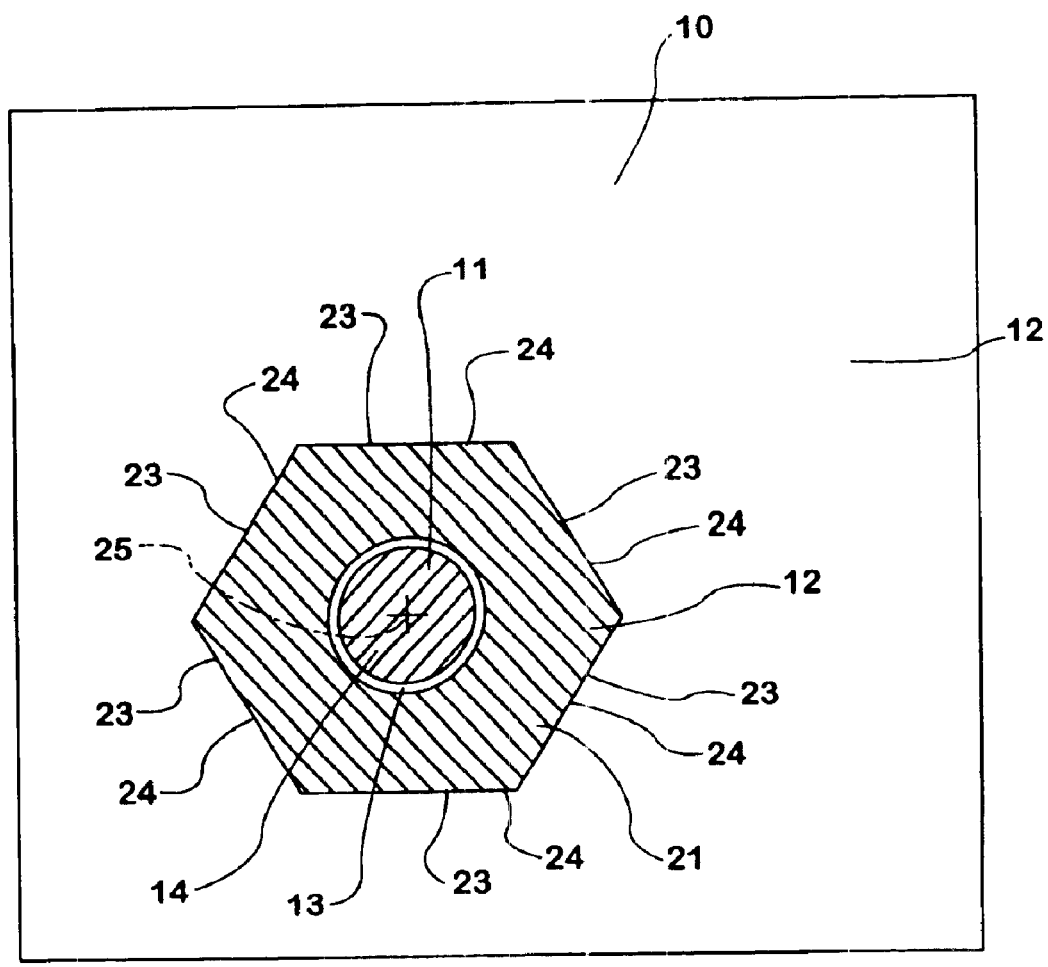
FIG. 7 is a sectional view through line 7—7 of FIG. 6.
Figure 8:
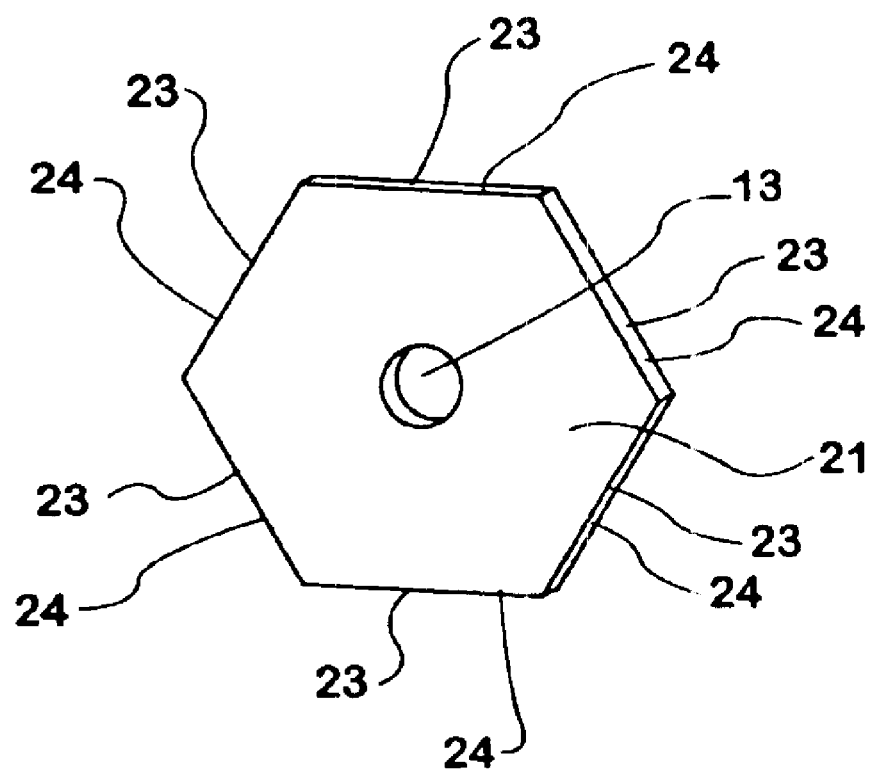
FIG. 8 is a perspective view of a clamp-force-check component in accordance with the present invention.

In most applications each of the clamped components 12 that are clamped together by a fastener assembly 11 define fastener holes 13 through themselves that are aligned with one another and through which a fastener shaft 14 of the assembly extends. There are, however, assemblies that comprise one or more clamped components 12 that are clamped together by a fastener assembly 11, the fastener shaft 14 of which does not extend through one or more of the clamped components 12. Such an assembly is illustrated in FIG. 4. FIG. 4 shows an assembly that has a plurality of clamped components 12 which are clamped together by a fastener assembly 11, which comprises two fastener shafts 14. The fastener assembly shown in FIG. 4 is one possible type of swaged-collar fastener 20. The clamping structures 15 of the fastener assembly shown in FIG. 4 include two collars 26 of the swaged-collar fastener 20 and a bridge 17 that interconnects the two fastener shafts 14 of the fastener assembly 14. It can be seen in FIG. 4 that some of the clamped components 12 of the assembly have no fastener shaft 14 passing through them. The fastener assembly that is shown in FIG. 4, in addition to being a swaged-collar fastener 20 is what is traditionally referred to as a U-bolt fastener assembly.

According to the preferred embodiment, the two or more clamped components 12, including the clamp-force-check component 21, that are clamped together by a fastener assembly 11, are part of a vehicle 27. Such a vehicle 27 comprises one or more frame structures 28 to which a large percentage of other components of the vehicle 27 are directly or indirectly engaged and from which those components derive support directly or indirectly. Such a vehicle 27 further comprises a suspension system 29 that is engaged to the one or more frame structures 28, that supports the one or more frame structures 28 above the ground, and that provides the vehicle 27 with a relatively low resistance to movement along the ground. Such a vehicle 27 also comprises one or more body structures 30 that are engaged to and supported by the one or more frame structures 28 and upon or within which passengers or cargo of the vehicle 27 may reside. In some embodiments the vehicle 27 may also comprise a powertrain 31 engaged to the one or more frame structures 28 and the suspension system 29 and operable to move the vehicle 27.

The inclusion of a clamp-force-check component 21 according to the present invention in the suspension system 29 of a vehicle 27 is particularly advantageous. The magnitude of the clamp force that fastener assemblies 11 apply to clamped components 12 of a suspension system 29 is very important. When a vehicle 27 is in use, clamped components 12 of its suspension system 29, which are clamped together by fastener assemblies 11, are subjected to large forces that cause slipping of the clamped components 12 relative to one another if the clamping force applied to the clamped components 12 by the fastener assembly 11 is not great enough. If the clamped components 12 of a suspension system 29 slip relative to one another, adverse handling of the vehicle 27 and even damage to the vehicle 27 can occur. Two clamped components 12 of a suspension system 29 that it is particularly important do not slip relative to one another are an axle beam 32 and an axle-locating component 33 such as a leaf-spring pack or a trailing arm 34. FIG. 4 illustrates an assembly that includes clamped components 12 comprising an axle beam 32, an axle-locating component 33 (which is a trailing arm 34 in FIG. 4), a clamp plate 35, and two clamp-force-check components 21 all of which are clamped together by a fastener assembly 11, which is a swaged-collar u-bolt fastener.

It will be understood by those skilled in the art that in some instances some features of the invention will be employed without a corresponding use of other features. It will also be understood by those skilled in the art that modifications could be made to the invention as described without departing from the spirit and scope of the invention and thus the scope of the invention is limited only by the following claims.

We claim:

1. An assembly, comprising:

(a) a fastener assembly that comprises a fastener shaft and two clamping structures which extend radially outward of the fastener shaft in directions perpendicular to an axis of the fastener shaft and are spaced relative to one another in directions parallel to the axis of the fastener shaft;

(b) two or more clamped components clamped together between the two clamping structures of the fastener assembly;

(c) a clamp-force-check component defining a fastener hole through which the fastener shaft extends being one of the clamped components and having a shape such that cross-sections of the clamp-force-check component perpendicular to the axis of the fastener have outer perimeters which are hexagonal and are spaced from one another a distance that is approximately an integer number of millimeters or a multiple of $1/16$ of an inch; and wherein the fastener assembly is a swaged-collar fastener.

2. The assembly of claim 1, wherein the clamp-force-check component is adapted to be used to determine a clamp force applied to the clamped components by the fastener assembly.

3. The assembly of claim 1, wherein the clamp-force-check component is adapted to be engaged by a wrench.

4. An assembly, comprising:

(a) a fastener assembly that comprises a fastener shaft and two clamping structures which extend radially outward of the fastener shaft in directions perpendicular to an axis of the fastener shaft and are spaced relative to one another in directions parallel to the axis of the fastener shaft;

(b) two or more clamped components clamped together between the two clamping structures of the fastener assembly;

(c) a clamp-force-check component defining a fastener hole through which the fastener shaft extends being one of the clamped components and having a shape such that cross-sections of the clamp-force-check component perpendicular to the axis of the fastener have outer perimeters which are hexagonal and are spaced from one another a distance that is approximately an integer number of millimeters or a multiple of $1/16$ of an inch; and wherein the fastener assembly is a rivet.

5. The assembly of claim 4, wherein the clamp-force-check component is adapted to be used to determine a clamp force applied to the clamped components by the fastener assembly.

6. The assembly of claim 4, wherein the clamp-force-check component is adapted to be engaged by a wrench.

7. A vehicle, comprising:

(a) one or more frame structures;

(b) a suspension system which is engaged to one or more of the frame structures and which supports at least one of the frame structures above the ground;

(c) a fastener assembly that comprises a fastener shaft and two clamping structures which extend radially outward of the fastener shaft in directions perpendicular to an axis of the fastener shaft and are spaced relative to one another in directions parallel to the axis of the fastener shaft;

(d) two or more clamped components clamped together between the two clamping structures of the fastener assembly;

(e) a clamp-force-check component defining a fastener hole through which the fastener shaft extends being one of the clamped components and having a shape such that cross-sections of the clamp-force-check component perpendicular to the axis of the fastener have outer perimeters which are hexagonal and are spaced from one another a distance that is approximately an integer number of millimeters or a multiple of 1/16 of an inch; and wherein the fastener assembly is a swaged-collar fastener.

8. The vehicle of claim 7, wherein: the clamped components comprise two or more components of the suspension system.

9. The vehicle of claim 8, wherein: the two or more components of the suspension system that are clamped components comprise an axle beam and an axle-locating component.

10. The vehicle of claim 7, wherein the clamp-force-check component is adapted to be engaged by a wrench.

11. The vehicle of claim 7, wherein the clamp-force-check component is adapted to be used to determine a clamp force applied to the clamped components by the fastener assembly.

12. A vehicle, comprising:

(a) one or more frame structures;

(b) a suspension system which is engaged to one or more of the frame structures and which supports at least one of the frame structures above the ground;

(c) a fastener assembly that comprises a fastener shaft and two clamping structures which extend radially outward of the fastener shaft in directions perpendicular to an axis of the fastener shaft and are spaced relative to one another in directions parallel to the axis of the fastener shaft;

(d) two or more clamped components clamped together between the two clamping structures of the fastener assembly;

(e) a clamp-force-check component defining a fastener hole through which the fastener shaft extends being one of the clamped components and having a shape such that cross-sections of the clamp-force-check component perpendicular to the axis of the fastener have outer perimeters which are hexagonal and are spaced from one another a distance that is approximately an integer number of millimeters or a multiple of 1/16 of an inch; and wherein the fastener assembly is a rivet.

13. The vehicle of claim 12, wherein: the clamped components comprise two or more components of the suspension system.

14. The vehicle of claim 13, wherein: the two or more components of the suspension system that are clamped components comprise an axle beam and an axle-locating component.

15. The vehicle of claim 12, wherein the clamp-force-check component is adapted to be engaged by a wrench.

16. The vehicle of claim 12, wherein the clamp-force-check component is adapted to be used to determine a clamp force applied to the clamped components by the fastener assembly.

* * * * *